United States Patent [19]

Deming

[11] 3,898,582

[45] Aug. 5, 1975

[54] TRANSMITTER ENCODER WITH OUTPUT FOR A TIME PERIOD

[75] Inventor: Andrew F. Deming, Alliance, Ohio

[73] Assignee: The Alliance Manufacturing Company, Inc., Alliance, Ohio

[22] Filed: Feb. 7, 1974

[21] Appl. No.: 440,473

Related U.S. Application Data

[62] Division of Ser. No. 204,149, Dec. 2, 1971, Pat. No. 3,823,378.

[52] U.S. Cl............... 331/75; 331/110; 331/116 M; 331/174; 343/228

[51] Int. Cl............................ H03b 5/26; H03b 5/30

[58] Field of Search..... 331/55, 75, 76, 110, 116 M, 331/173, 174; 307/239, 240, 253; 343/225, 228

[56] References Cited

UNITED STATES PATENTS

| | | | |
|---|---|---|---|
| 3,202,938 | 8/1965 | Eklov | 331/174 X |
| 3,522,536 | 8/1970 | Reynolds | 343/225 |

*Primary Examiner*—Siegfried H. Grimm
*Attorney, Agent, or Firm*—Woodling, Krost, Granger & Rust

[57] ABSTRACT

A transmitter encoder is disclosed with the transmitter having a carrier frequency and a modulation frequency and the encoder influencing the modulated carrier at a third frequency rate. Typically the third frequency is lower than either the modulation or carrier frequencies and a disclosed influencing circuit is to interrupt the modulated carrier at the third frequency rate. The encoder is easily connected to the transmitter, for example, by plugging into electrical junctions on the transmitter with the transmitter completely operative as a modulated transmitter prior to electrical connection of the encoder. The encoder develops the third frequency for only a short timed period while a timing capacitor is charged, and after charging turns on an output transistor. Once the output transistor is conducting, the third frequency no longer influences the carrier frequency, which is radiated with only the first modulation frequency thereon.

8 Claims, 3 Drawing Figures

TRANSMITTER ENCODER WITH OUTPUT FOR A TIME PERIOD

This is a division, of application Ser. No. 204,149, filed Dec. 2, 1971 now U.S. Pat. No. 3,823,378.

BACKGROUND OF THE INVENTION

The disclosed transmitter may be used with remote control systems, for example, a remotely controled garage door opener. In such use the transmitter may be a hand-sized powered low output power transmitter complying with Federal Communication Commission regulations as to radiated power. The carrier may be in the VHF range, for example, with modulation in the audio or super-audio frequencies.

The transmitter sends a signal to a corresponding receiver and if the proper carrier and modulation frequencies for that set of transmitter and receiver is received by the receiver, then an output signal is given. This output signal may be used to remotely control some particular device, for example a garage door. In many cases the garage door being controlled is in a garage attached to the home and if unauthorized persons were able to easily operate the garage door operator receiver, then unauthorized access to the garage and to the home could be achieved. Thus a security problem occurs and it becomes increasingly important to increase the number of codes and the complexity of the codes in order to prevent unauthorized access to the garage and home. If there are only six different carrier frequencies and six different modulation frequencies, then this gives a total of six times six or thirty-six different possible codes. If there are ten carrier frequencies and ten modulation frequencies, for example, then this would give a total possibility of one hundred codes. However, because of FCC regulations, the number of carrier frequencies which may be used without interference with each other is limited, thus limiting the total possible number of codes. Also, with only six or ten carrier frequencies plus a similar range of modulation frequencies, it is relatively easy for a lawbreaker to gain access to the garage. For example, if such a person had six or ten different transmitters each on one of the assigned code of carrier frequencies, then each in turn could be turned on and gradually adjusted through the range of audio frequencies. Thus, all 36 or 100 possible codes could be swept through in a matter of 1 or 2 minutes and the lawbreaker could easily gain access to the garage or home.

In many areas of high saturation of garage door operators, there is an increasing problem of the transmitter of a neighbor operating the wrong garage door operator receiver. Thus the operator of an automobile driving along a street and depressing the transmitter pushbutton switch, could trigger receivers to open garage doors, which are the wrong garage doors, unless the carrier frequencies and modulation frequencies of the coding scheme have sufficient separation therebetween, and do not have a tendency to heterodyne to produce one of the carrier or modulation frequencies of the coding scheme.

In order to make the garage and home more secure, more codes have been suggested but this method of increasing the number of possible codes by increasing the number of carrier or modulation frequencies, runs into difficulty with the FCC regulations and runs into further difficulty with trying to select frequencies which do not interact with each other by heterodyning so as to produce one of the frequencies of the codes.

One prior art attempt at increasing the security was to produce a transmitter and receiver system wherein the transmitter had one carrier frequency out of a number of possible frequencies, for example, six or ten. Next, two separate modulation frequencies were provided in the transmitter with the transmitter first emitting a radiated signal of the carrier modulated by the first modulation frequency and then immediately afterward the first modulation frequency ceased and the second modulation frequency commenced for an additional time period. The receiver of that particular set would be tuned to that particular carrier frequency and would have a detector means to detect the first and second modulation frequencies with a time delay on drop out of detection of the first modulation frequency. This meant that the first modulation frequency had to be detected first, with a time delay hold-over of the relay contacts being held closed during the time that the second modulation frequency was detected, in order for an output signal to be developed by the receiver. This increased the security but required a considerably more complex receiver system and required a more complex transmitter system such that only the first and second modulation frequencies were transmitted and were transmitted in sequence but not simultaneously.

Accordingly, an object of the invention is to provide a transmitter system with an encoder to obviate the above-mentioned disadvantages.

Another object of the invention is to provide a transmitter subcoder such that the transmitter simultaneously transmits three different frequencies.

Another object of the invention is to provide a transmitter subcoder wherein the subcode does not detune the transmitter circuit transmitting the modulation frequency.

Another object of the invention is to provide a transmitter subcoder wherein a third frequency is provided for only a short length of time and then ceases to thus increase the security by requiring that the receiver be responsive to this third frequency and then responsive to the termination of the third frequency with only a modulated carrier wave.

SUMMARY OF THE INVENTION

The invention may be incorporated in a transmitter comprising, in combination, means to develop a carrier frequency, means to develop a modulation frequency, a power supply having first and second terminals of different voltages, output circuit means, first means connecting said power supply terminals to said frequency developing means and to said output circuit means to establish an output from said output circuit means containing both said carrier and modulation frequencies, first and second junctions connected to said frequency developing means and one of said supply terminals, respectively, a subcoder or encoder having first and second connectors connectable with said first and second junctions, respectively, to establish a source potential in said subcoder, means at least partly in said subcoder to develop a third frequency, and second means connecting said third frequency developing means to said first connector to establish a modulated carrier wave output from the transmitter influenced at said third frequency rate.

Other objects and a fuller understanding of the invention may be had by referring to the following description and claims, taken in conjunction with the accompanying drawing.

DESCRIPTION OF THE PREFERRED EMBODIMENT

Figure 1:
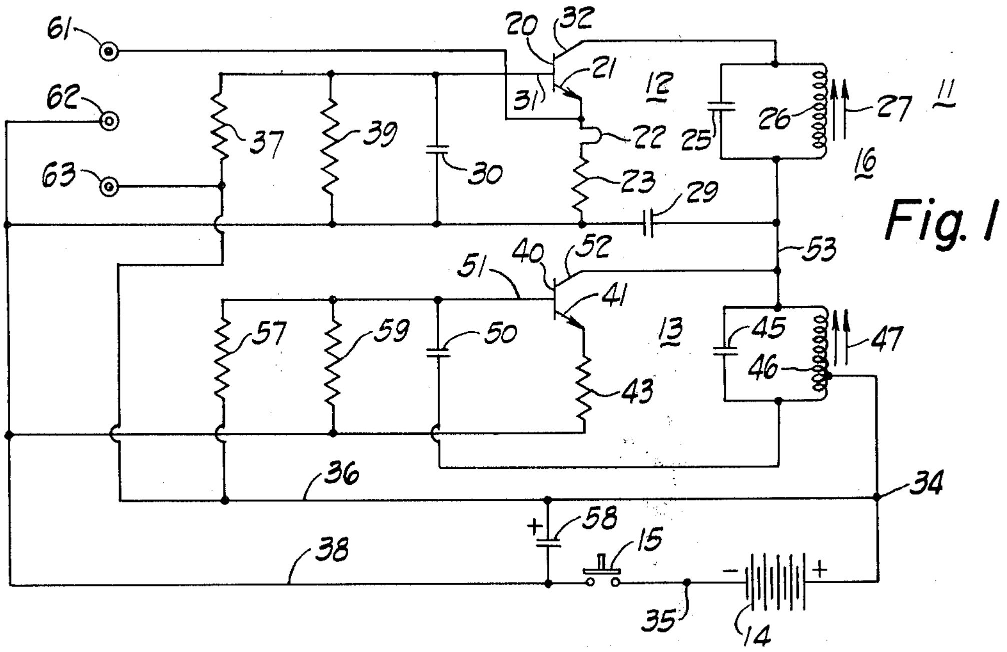
FIG. 1 is a schematic diagram of a transmitter circuit.

FIG. 1 is a schematic diagram of a transmitter 11 which incorporates the invention. This transmitter has a means 12 to develop a carrier frequency and this is shown as a carrier frequency oscillator. The transmitter 11 also has a means 13 to develop a modulation frequency and this means 13 is shown as a modulation frequency oscillator. A power supply 14 is provided in the transmitter and this may be a primary battery, especially where the transmitter is of low power for example, a hand-sized VHF transmitter usable with remote control of garage door operator receivers. A switch such as a push-button switch 15 is provided as is output circuit means 16. Means is provided including the switch 15 to connect the power supply 14 to the frequency developing means 12 and 13 to establish an output from the output circuit means 16 which contains both the carrier and modulation frequencies. To this end, the carrier frequency oscillator 12 includes a transistor 20 having an emitter 21 connected through a jumper 22 and an output load impedance shown as an output load resistor 23. The resistor 23 is connected in the output circuit 16 and this output circuit means may include a parallel resonant circuit of a capacitor 25 and inductance 26. The inductance may have a movable permeable core 27 for tuning purposes. Capacitors 29 and 30 connect the lower end of the parallel resonant circuit 25–26 to the base 31 of transistor 20. These capacitors provide a feedback from the tank circuit 25–26 in order to sustain oscillations. The upper end of this tank circuit is connected to the collector 32 of the transistor 20 in order to complete the output circuit means 16.

The power supply 14 has first and second terminals 34 and 35, respectively, of different voltages. The first terminal 34 is the positive terminal of the power supply 14 and is connected to a conductor 36 and through a current limiting resistor 37 to the base 31 of transistor 20. The second power supply terminal 35 is connected through the push-button switch 15 to a conductor 38 and this may be considered the ground side of the power supply 14. This conductor 38 is connected through a bias resistor 39 to the base 31 of transistor 20. Conductor 38 is also connected to the interconnection of capacitors 29–30 and resistor 23. The transistor 20 with the connections as shown will oscillate at a frequency determined by the parallel resonant circuit 25–26 which may be in the VHF range, for example, 250–300 MHz.

The modulation frequency oscillator has a circuit quite similar to that of the carrier frequency oscillator except with different values of components to have the modulation frequency lower than the carrier frequency, for example, in an audio or super-audio range of 500–20,000 Hz. The modulation frequency oscillator 13 includes a transistor 40 with an emitter 41 connected through a resistor 43 to the conductor 38. A parallel resonant tank circuit is provided in this modulation frequency oscillator 13 including a capacitor 45 and inductance 46. The inductance 46 may have a movable permeable core 47 for tuning to the desired modulation frequency. A feedback capacitor 50 connects the lower end of the tank circuit 45–46 to the base 51 of transistor 40. The upper end of the tank circuit 45–46 is connected to the collector 52 by a conductor 53 which also connects together the tank circuits of the two oscillators 12 and 13. A current limiting resistor 57 connects the conductor 36 to the base 51 and a resistor 59 connects the base 51 to the conductor 38. The transistor 40 will oscillate at the modulation frequency determined by the values of the parallel resonant circuit 45–46. A power supply capacitor 58 may be connected across the power supply 14.

Figure 2:
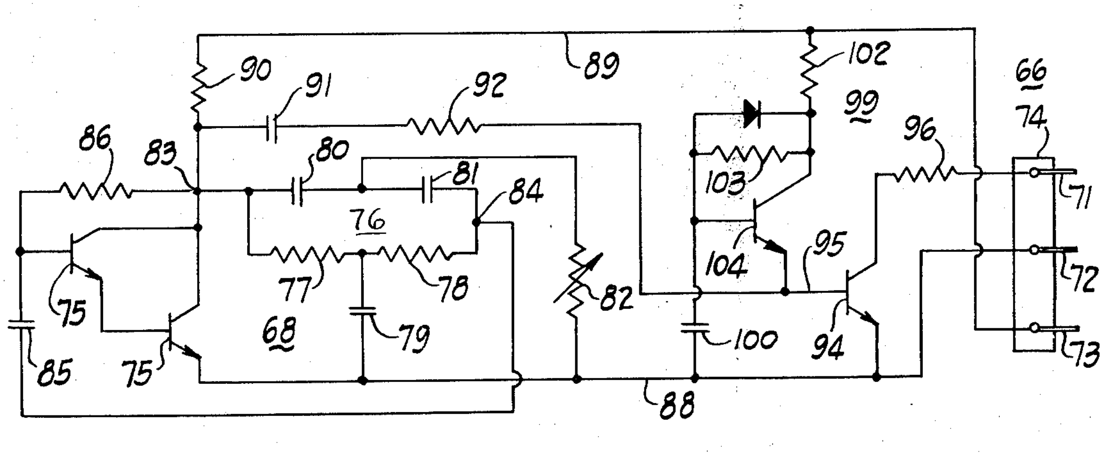
FIG. 2 is a schematic diagram of a subcoder connectable to the transmitter of FIG. 1; and, FIG. 3 is a schematic diagram of a modified form of subcoder.

First, second and third junctions 61, 62 and 63, respectively, are provided in the transmitter 11. Junction 61 is connected to the interconnection of emitter 21 and jumper 22. The second junction 62 is connected to the ground conductor 38 and the third junction 63 is connected to the positive power supply terminal 34 via conductor 36. These junctions 61–63 provide a ready means for connection to a subcoder or encoder 66 shown in FIG. 2. This subcoder 66, together with the transmitter 11, has a means 68 to develop a third frequency. This third frequency may be a subcode and preferably is a frequency lower than either the carrier or the modulation frequency. The third frequency developing means 68 is at least partly in the subcoder 66 and in this preferred embodiment is shown as being incorporated in circuitry of the subcoder 66. The subcoder 66 has first, second and third terminals or connectors 71, 72 and 73. These connectors are connectable to the junctions 61–63, respectively, and for ease of this interconnection the subcoder 66 may simply be plugged into the transmitter 11 by having male connectors 71–73 on a terminal strip 74 receivable in female connections of the junctions 61–63. The transmitter 11 may be mounted on a printed circuit board as an example, and the subcoder may be mounted on another smaller printed circuit board with the teminal strip 74 an integral part thereof. This subcoder 66 in the preferred embodiment of FIG. 2 includes a Darlington transistor pair 75 connected to null resonant circuit means 76 to act as an oscillator which oscillator may be the principal component of the third frequency developing means 68. The circuit means may take one of several forms and in FIG. 2 is shown as including a bridge T filter network. Resistors 77, 78 and capacitor 79 form one T and capacitors 80, 81 and variable resistor 82 form another T which together form the bridge T 76. This bridge T network 76 has terminals 83 and 84. A feedback capacitor 85 establishes the transistor 75 oscillating at the null frequency of the bridge T circuit 76. A bias resistor 86 biases the transistor 75 into a proper operating condition.

The second connector 72 is connected to a ground conductor 88 and third connector 73 is connected to the positive power supply voltage in transmitter 11 and is connected to a conductor 89 in the subcoder 66. This conductor 89 is connected through a resistor 90 to the terminal 83 of the null resonant circuit means 76. This null resonant circuit means 76 is one which has a null at the desired frequency, hence a minimum output across terminals 84 and conductor 88. The output at terminal 83 is passed by a coupling capacitor 91 and resistor 92 to an output circuit which includes a transistor 94. The resistor 92 is connected to the base 95 of this transistor 94. The emitter of transistor 95 is connected to the connector 72 and the collector of this transistor is connected through a current limiting resistor 96 to the connector 71. Accordingly, the conduction or non-conduction of transistor 94 gives an output signal on connectors 71 and 72.

A timing circuit 99 is provided in the subcoder 66 to provide a time delay period. This may be considered a second time delay period with the first time delay period that established by the resonant circuit means 76. Many such resonant circuit means take a certain finite time to "ring" or come up to full resonance. Such first time delay period may be quite short, for example, 0.01 seconds up to 0.1 seconds. The timing circuit 99 includes primarily a capacitor 100 and a transistor 104 to amplify the effect of capacitor 100. Resistors 102, 103 cooperate with capacitor 100 for an RC charging time delay network. This time delay may be any suitable value for example, 1/10 second to three seconds and after the capacitor 100 is charged, then the transistor 104 is turned on continuously. This turns on transistor 94 continuously for a minimum potential difference across terminals 71 and 72. This is after the second time delay period of perhaps ½ second and during that second time delay period, while capacitor 100 is charging, the transistor 20 is influenced at the third frequency rate by the output from Darlington transistor pair 75 appearing at terminal 83. This means that during this second time delay period the transistor 94 is turned on and off at the third frequency rate. When transistor 94 is not conducting, this means there is a high impedance condition between terminal 71 and 72. This turn on and off of transistor 94 interrupts the radiated modulated carrier at the third frequency rate. This is like 100% modulation with a square wave.

Operation

Now referring to FIG. 1, it may be observed how the subcoder 66 affects the transmitter 11. When the connectors 71-73 are plugged into the junctions 61–63, then the interconnection of connector 72 and junction 62 establishes a reference potential in the subcoder 66. This is the zero volts or ground reference potential. The interconnection of junction 63 and connector 73 establishes another potential in the subcoder 66 at a potential different from that on terminal 72. Accordingly, an operating voltage is supplied to this subcoder 66. In the example shown this is plus nine volts applied to the subcoder 66. The interconnection of junction 61 and connector 71 establishes that the output of the subcoder 66 is applied to the transmitter 11. More particularly, the output of the subcoder 66 appears on connectors 71 and 72 and it will be seen in FIG. 1 that this output is applied to junctions 61 and 62 which is in parallel with the output load resistor 23. The jumper 22 may easily be formed from a U-shaped bend in the lead of this resistor as it is mounted on the printed circuit board. This jumper may easily be cut by a person plugging the subcoder 66 into the transmitter 11. With this jumper 22 cut, then the output of the subcoder is no longer in parallel with the resistor 23, instead it takes the place of this resistor 23. Preferably the effective impedance of the transistor 94 plus resistor 96 when this transistor 94 is conducting is the same as the resistance of resistor 23. In one practical embodiment of a circuit made in accordance with this invention, resistor 23 was 560 ohms, resistor 96 was 470 ohms and transistor 94 when conducting had the difference of about 90 ohms impedance. Accordingly, it will be seen that the transmitter 11 operation is virtually unaffected in its operation during the time transistor 94 is conducting, because there are no changes in impedance or circuit parameters. Thus, as the transistor 94 intermittently conducts at the third frequency or subcoding rate, this establishes the influence on the transmitter 11 at this third frequency rate. More specifically, the output circuit means 16 of this transmitter 11 will radiate a modulated carrier wave interrupted at the third frequency rate. In one actual embodiment of transmitter made in accordance with this invention, this third frequency was on the order of 300 to 15,000 Hz. The radiation is from the inductance 26 which acts as a radiating antenna.

The timing circuit 99 establishes the charging of capacitor 100 from the power supply source 14. This is the second time delay period and this might be 1/10 to 3 seconds, for example. After this second time period, the capacitor 100 is charged, which means that transistor 104 is turned fully on and this turns transistor 94 fully on. Accordingly, it is no longer influenced by the output from the oscillator 68. Also this continuous conduction of transistor 94 means that the transmitter 11 is no longer influenced at the third frequency rate. More specifically, the continuous conduction of transistor 94 means that the carrier wave is transmitted as a modulated carrier wave modulated only at the modulation frequency of oscillator 13 and is not influenced at any third frequency rate. This has the advantage that it does not detune the modulation frequency oscillator and hence the receiver of the transmitter-receiver set will be receiving a modulation frequency and a carrier frequency at the proper values.

Second Embodiment

Figure 3:
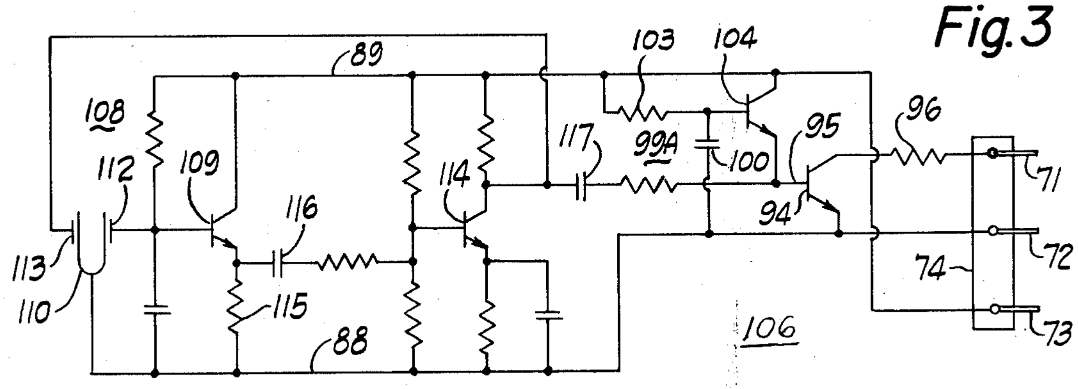

FIG. 3 shows an alternative subcoder 106 which may be used in place of the subcoder 66 of FIG. 2 and will also plug into the junctions 61–63 in the transmitter of FIG. 1. To this end the subcoder 106 again has the connectors 71–73 to be connected to the junctions 61–63. This subcoder 106 has a means 108 to develop a third frequency which includes a transistor 109 and resonant circuit means 110 shown as a tuning fork. This may be any of the usual forms of tuning fork oscillator circuits, with a capacitive plate 112 cooperating with the tuning fork 110 and supplying drive to the base of transistor 109. Another capacitive plate 113 cooperating with the tuning fork has a feedback from the output of a transistor 114 to sustain oscillation. The oscillation of transistor 109 is supplied to an emitter follower resistor 115 and this output is passed by a coupling capacitor 116 to the base input of transistor 114. The output of transistor 114 appears at the collector for the aforementioned feedback and is coupled through another coupling capacitor 117 to the base 95 of transistor 94. Again a timing circuit 99A is provided which includes transistor 104, resistor 103 and capacitor 100.

Operation

When the subcoder 106 is plugged into the transmitter 11 it operates in essentially the same manner as when subcoder 66 was plugged into transmitter 11. A first time delay period is established after push-button switch 15 is closed. This first time delay period is caused by the tuning fork 110 or resonant circuit means building up the amplitude of oscillations to the normal value. This might be 1/100 to 1/4 of a second. The timing circuit 99A establishes a second time delay period during which the modulated carrier wave being radiated is influenced at the third frequency rate. During this second time delay period, the capacitor 100 is charging and also during this time the oscillator 108 is oscillating and affecting the base 95 of transistor 94 at this third frequency rate. Accordingly, transistor 94 is turned on and off at this third frequency rate which turns on and off the modulated carrier frequency radiated from the output circuit means 16 at this third frequency rate. At the completion of the second time delay period, the capacitor 100 is virtually charged which means that transistor 104 is turned fully on as is transistor 94, hence it is no longer influenced by the continuously running oscillator 108. Accordingly, after this second time delay period the radiated emissions are only of the carrier modulated at the modulation frequency of oscillator 13. The transistor 104 is an amplifier and also a buffer to prevent the continuous conduction of transistor 94, subsequent to the second time delay period, from influencing the oscillator 108. This has the advantage of not affecting the frequency of the oscillator circuit 108 and hence maintaining the same frequency in a particular transmitter-receiver set.

From the above it will be noted that either subcoder 66 or 106 may be used interchangeably with the transmitter 11 and prior to plugging a subcoder into the transmitter, the transmitter is a completely operable unit radiating a modulated carrier wave and usable with a receiver tuned to the same carrier and modulation frequencies. If security is required in addition to that afforded by the possible carrier frequencies and possible modulation frequencies, then the subcoder 66 or 106 may easily be added to the transmitter and a complementary decoder added to the receiver. For example, if 10 possible transmitter frequencies are usable and 10 possible modulation frequencies are usable, this would give 100 possible codes. Adding a subcoder with another 10 possible frequencies, this gives 1,000 possible codes. Actually it has been found that the security achieved by the addition of this third frequency is considerably more than merely a 10-fold increase in security. Referring to FIG. 3 with the tuning fork 110, it will be observed that this tuning fork could be induced into oscillation by a physical shock. However, this alone does not establish a third frequency output. Before the right combustion of carrier, modulation and subcoding frequencies occur, five things must be properly established:

1. The push-button switch 15 must be closed;
2. The carrier frequency oscillator 12 must be at the right frequency;
3. The modulation frequency oscillator 13 must be at the right frequency;
4. The third frequency oscillator 108 must be at the right frequency; and,
5. The capacitor 100 must not be charged.

This fifth criteria above is accomplished by the timing circuit 99 and takes only 1/10 to 3 seconds to accomplish. Accordingly, a lawbreaker would have a very short time in order to try to fulfill these five criteria. This is why the security is increased much more than 10-fold by the addition of a third frequency.

An additional advantage is achieved by having the subcoder 66 or 106 as a plug-in module rather than permanently wired into the transmitter 11. If a customer wants only a minimum security of one of a range of carrier frequencies and one of a range of modulation frequencies, then the transmitter 11 is completely usable as part of a transmitter-receiver set. However, let us assume that after the consumer has purchased the transmitter-receiver set, he desires (1) either more security or (2) increased freedom from spurious interference which might be operating his garage door on spurious signals. In such a case, the service man or dealer may simply plug the subcoder into the transmitter 11, cut the jumper 22, place a similar decoder in the receiver of that set and the customer has accomplished both things, namely, increased security and increased freedom from spurious signal operation of his garage door. The transmitter 11 at that time is one which has not only the two frequencies originally built into it, but it also has the third frequency of the subcoder.

Still another advantage is gained by the dealer or distributor because he does not need to stock nearly as many parts as he did before. Considering only the transmitter of the transmitter-receiver set, and if one assumes 10 possible carrier frequencies, 10 possible modulation frequencies and 10 possible subcoding frequencies, the dealer or distributor does not need to stock one thousand different transmitters. He needs to stock only 10 different transmitters of different carrier frequencies, plus 90 more transmitters for the 10 different modulation frequencies of each of the 10 carrier frequencies, plus 10 different subcoders 66 or 106. This is a stocking of 110 parts rather than 1,000 parts. Actually, the stocking of the 90 additional transmitters to cover the possible 100 codes of modulation and carrier frequencies, may be eliminated if the dealer or distributor wishes to tune the movable cores 47 for the particular modulation frequency desired. These are continuously movable tuning slugs and with some frequency standard these modulation frequencies may quickly be set by a simple screwdriver adjustment. In such case, one would need to stock only ten transmitters for the 10 different carrier frequencies, plus ten subcoders for the 10 different subcoding frequencies for a total of stocking only 20 parts rather than 1,000 parts. A similar saving in the stocking of receivers of the transmitter-receiver set is also effected and hence this is a tremendous saving in cost and convenience to the dealer and distributor who needs to stock such a materially reduced number of units.

The subcoder 66 or 106 is a transmitter encoder or modulator. This subcoder has first, second and third terminals with a DC source adapted to be connected to the second and third terminals 72 and 73. The oscillator 68 or 108 is a means to develop a frequency which is used for modulating the output of the transmitter 11. A null resonant circuit means 76 establishes that the oscillator 68 operates at a particular frequency in FIG. 2. In FIG. 3 the frequency of oscillation is established by the physical characteristics of the tuning fork 110. An output circuit is included which includes the output transistor 94 connected to the first and second terminals 71 and 72. This transistor has an input from the oscillator so that it intermittently conducts at a given frequency. It does this until a timing circuit has completed a time delay period. The timing circuit 99 or 99A includes a timing capacitor 100 and a timing transistor 104. The timing capacitor is changed in its charge condition by a voltage from the DC source. In the preferred embodiment this change of charge condition is a charging rather than discharging condition. When the capacitor has charged to a predetermined value, the timing transistor 104 continuously conducts and this establishes the output transistor 94 continuously conducting. The transistor 94 is a preferred form of a semiconductor switch which changes from its intermittent conduction during the time period delay to one of a conduction or non-conduction condition. In the preferred embodiment this change is to a continuous conduction condition.

The present disclosure includes that contained in the appended claims, as well as that of the foregoing description. Although this invention has been described in its preferred form with a certain degree of particularly, it is understood that the present disclosure of the preferred form has been made only by way of example and that numerous changes in the details of the circuit and the combustion and arrangement of circuit elements may be resorted to without departing from the spirit and scope of the invention as hereinafter claimed.

What is claimed is:

1. A transmitter encoder, comprising in combination, first and second terminals with said second terminal adapted to be connected to a DC source, means to develop a given frequency, an output transistor having input and output electrodes, means connecting said output electrodes to said first and second terminals, means applying the output of said frequency developing means to said input electrodes of said transistor to effect intermittent conduction thereof at said given frequency rate, timing circuit means including timing capacitive means and a timing transistor, means connecting said capacitive means to said second terminal for a change of charge condition, means connecting said timing capacitive means to said timing transistor to turn on said timing transistor upon said timing capacitive means being charged to a predetermined value, and means connecting said timing transistor to said output transistor to turn on continuously said output transistor upon said timing capacitive means charging to said predetermined value and turning on said timing transistor.

2. A transmitter encoder as set forth in claim 1, wherein said output transistor is a switching transistor.

3. A transmitter encoder as set forth in claim 1, wherein said given frequency developing means includes an amplifier and circuit means connected to said amplifier to establish the output thereof as an oscillator at said given frequency.

4. A transmitter encoder as set forth in claim 1, including a third terminal adapted to be connected to a DC source for a potential difference between said second and third terminals.

5. A transmitter encoder as set forth in claim 4, including means connecting said capacitive means to said third teminal for charging said capacitive means.

6. A transmitter encoder as set forth in claim 1, wherein said given frequency developing means includes null resonant circuit means.

7. A transmitter encoder as set forth in claim 1, wherein said given frequencies developing means includes a mechanically vibratable tuning fork.

8. A transmitter encoder as set forth in claim 3, wherein said circuit means connected to said amplifier is resonant circuit means.

* * * * *